United States Patent Office 3,338,562
Patented Aug. 29, 1967

3,338,562
MIXERS
George F. Fox, Retford, England, assignor to W. J. Jenkins & Company Limited, Retford, England, a British company
Filed June 1, 1965, Ser. No. 460,041
Claims priority, application Great Britain, Jan. 15, 1965, 1,971/65
9 Claims. (Cl. 259—40)

This invention concerns mixers and has for its object the provision of a mixer capable of accomplishing thorough and rapid mixing of mixture ingredients, liquid and/or solid, fed thereto.

A mixer in accordance with the invention comprises at least one mixing receptacle having therein at least one conveying screw rotatable about its own axis to move material within the receptacle in the direction of the length of such screw, a driving arm arranged for rotation about an axis substantially coincident with the axis of symmetry of the receptacle, a screw arm mounted on said driving arm eccentric of the axis of rotation thereof for rotation about an axis substantially parallel with the axis of rotation of said driving arm, means for rotating said driving arm and said screw arm about their respective axes of rotation, said conveying screw being articulated to said screw arm at a point remote from the axis of rotation thereof, whereby at least that part of the conveying screw articulated to said screw arm will follow a path, within and relative to said receptacle, with a motion having both a rotational component about and a radial component to and from the axis of symmetry of said receptacle.

Said conveying screw may be of simple Archimedian form with a "thread" of constant or varying pitch throughout its effective length so that unidirectional rotation thereof is effective to convey material, in the receptacle, in one direction along the length of the screw or the screw may be of compound form, different portions of the effective length thereof having "threads" of different hand and/or the screw having two or more coaxial "threads" to produce (with unidirectional rotation of the screw about its axis), in the material within the receptacle, a complex flow pattern that aids rapid mixing of such material. In all cases the bodily motion of the screw produces a stirring of material within the receptacle and conduces to complete and intimate mixing of all portions of the material in the receptacle.

If desired, means may be provided for varying the pitch of the "thread" or "threads" of the screw to suit different materials to be mixed.

One end of said conveying screw may, if required, be restrained against radial movement with respect to the axis of symmetry of the receptacle by means that permit the screw to rotate about its own axis whilst the other end of the screw has a motion with both rotational and radial components with respect to the axis of symmetry of the receptacle.

Alternatively, both ends of the screw may be arranged to follow geometrically similar paths, the arrangement chosen preferably being such that the envelope of the motion of the screw as a whole corresponds with the internal surface of the receptacle, that is, so that the screw effectively sweeps the internal surface of the receptacle.

Very conveniently said receptacle may be of inverted hollow conical form and may have an outlet towards the lower apex end thereof.

In a preferred embodiment of mixer one end of the screw is restrained against movement with respect to the axis of symmetry of the receptacle by means of a universal joint positioned at the apex of the receptacle. It should be appreciated, of course, that a crank arm may be interposed between the said universal joint and the appropriate end of the screw or, alternatively, such crank arm may be positioned between the universal joint and the receptacle.

According to yet another feature of the invention, said screw may be rotated about its axis by a motor unit interconnected with the universal joint through the intermediary of transmission means including, where desired, a flexible or sliding coupling. The end of the screw remote from the universal joint is given the radial motion in the manners referred to hereinbefore, by means of a geared motor unit including clutch means and a reduction gear unit. Very conveniently, and in a preferred arragement, the said end of the screw remote from said universal joint is articulated to a screw arm through the intermediary of a ball joint.

In order that this invention may be more readily understood, and further features of the same more fully appreciated, certain embodiments of mixer will now be described by way of example and with reference to the accompanying drawings, in which.

Figure 1:
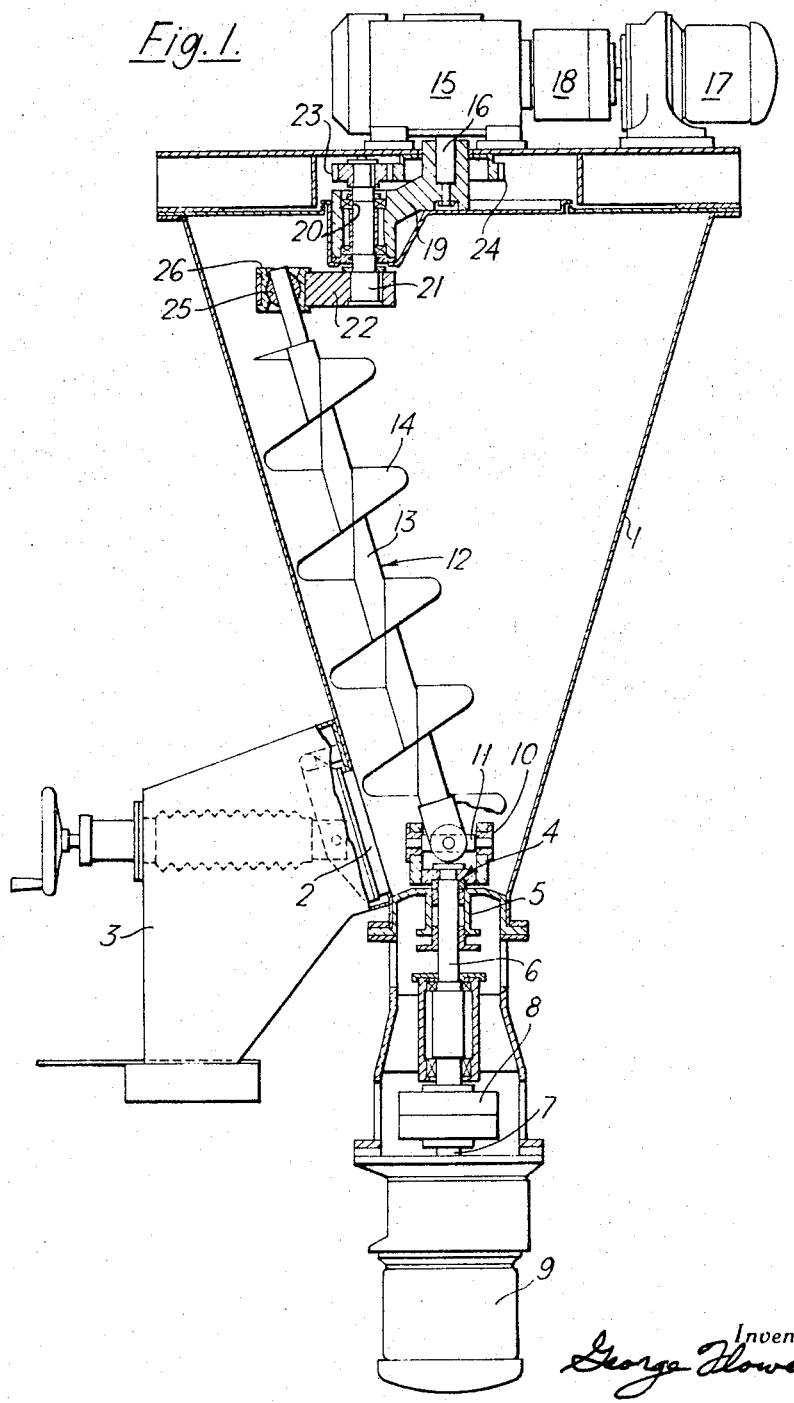
FIGURE 1 is a vertical medial sectional view through a preferred embodiment of mixer in accordance with this invention.

In the embodiment of mixer shown in the accompanying drawings, there is provided an inverted hollow conical mixing receptacle 1 provided with an outlet closable by a door 2 towards the lower apex end thereof, such outlet being provided in the wall of the receptacle and communicating with a chute or spout 3.

Secured at the apex lower end of the receptacle on the axis of symmetry thereof is a universal joint 4, such joint being carried in a bearing 5 by a shaft 6 secured at its end remote from the joint 4 through the intermediary of the driving shaft 7 and flexible or sliding coupling 8 to a suitably geared electric motor unit 9. The coupling is in the form of a limited slip clutch and is provided to ensure that the said motor is not accidentally overloaded.

Secured to the said universal joint 4, which comprises a bifurcated member 10 supporting a pivot pin 11, is one end of a conveying or mixing screw 12. Such conveying screw 12 comprises a central main shaft 13 having secured thereto a spiral flange 14 arranged to provide a suitable pitch.

The upper end of the receptacle is closed in such a manner that a reduction gear unit 15 may be supported above the receptacle on the axis of summetry of the receptacle. This reduction gear unit 15 carries a downwardly-directed axial driving spindle 16 adapted to be rotated by an electric motor unit 17 drivingly engaged with the reduction gear unit through the itermediary of a clutch mechanism 18.

Secured to the said driving spindle 16 is a radiallly disposed rotary driving arm 19 which, in turn, carries a bearing 20 for receiving a driving shaft 21 for supporting and causing rotation of a further radial screw arm 22 attached to the end of the screw 12 remote from the universal joint 4. The said shaft 21 that carries this further screw arm 22 passes upwardly through the driving arm 19 on the driving spindle 16 and carries a gear wheel or pinion 23 which is rotated as a result of its engagement with a fixed co-operating gear wheel or toothed annulus 24.

Interconnection between the screw 12 and the said screw arm 22 is arranged by passing the screw through a spherical collar 25 located within a spherical rebate 26 at the free end of said screw arm 22.

Rotation of the driving spindle 16 under the influence of the motor unit 17 causes the driving arm 19 radiating therefrom to rotate so that such driving arm 19 rotates around the axis of symmetry of the receptacle 1. Such rotation causes the shaft 21 carrying the screw arm 22 to rotate about its own axis as a result of the gear wheel 23 secured thereto meshing with said co-operating gear wheel 24. Such axial rotation of the shaft 21 causes rotation of the screw arm 22 carried thereby and the end of the screw 12 secured thereto will thus follow a path, within the receptacle, with a motion including both rotational and radial components about the axis of symmetry of the receptacle.

The screw 12 is also rotated about its own axis by means of the motor unit 9 causing rotation of the universal joint 4 at the lower apex end of the receptacle 1.

It will be appreciated that the path followed by the said screw 12 will ensure that material to be mixed within the receptacle will be moved in a direction along the screw 12 and, furthermore, the rotational and radial components of the motion about the axis of symmetry will ensure that all parts of the receptacle 1 are included within the range of the screw. Very thorough and intimate mixing will thus take place.

Figure 2:
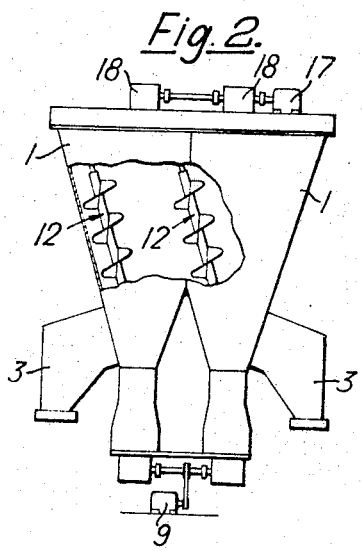
FIGURE 2 is a side elevational view of a still further embodiment of mixer.

Furthermore, a mixer in accordance with this invention may comprise more than one receptacle and each receptacle may have one or more screws rotating therewithin. Such a mixer is illustrated diagrammatically in FIGURE 2, there being two receptacles 1, two screws 12, and single motor units 9, 17 respectively driving both the screws 12.

Figure 5:
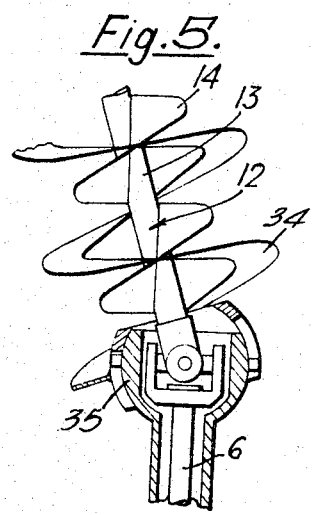
FIGURE 5 is a fragmentary side elevational view of a third form of mixing screw.
Figure 3:
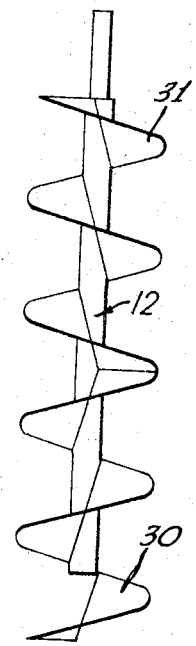
FIGURE 3 is a fragmentary side elevational view of one form of mixing screw.
Figure 4:
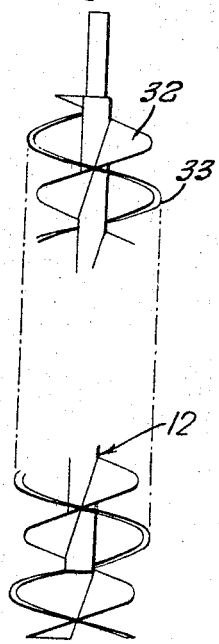
FIGURE 4 is a fragmentary side elevational view of a second form of mixing screw.

FIGURES 3, 4 and 5 illustrate three alternative forms of conveying screw 12, the screw of FIGURE 3 having "threads" of different hands, such threads of different hands being formed by spiral flanges 30, 31.

FIGURE 4, however, shows a screw 12 having two coaxial "threads" respectively formed by a spiral flange 32 and a spiral band 33.

The screw 12 shown in FIGURE 5, however, comprises a main shaft 13 and a spiral "thread" formed by a flange 14 in the manner described with reference to FIGURE 1. However, this screw is of compound form and is surrounded by a separately rotatable flange 34 associated with a modified universal joint generally designated 35, such joint permitting the flanges 14 and 34 to be rotated separately at different speeds and/or in different directions.

I claim:

1. A mixer comprising at least one mixing receptacle having therein at least one conveying screw rotatable about its own axis to move material within said receptacle in the direction of the length of said screw, a driving arm arranged for rotation about an axis substantially coincident with the axis of symmetry of said receptacle, a screw arm mouthed on said driving arm eccentric of the axis of rotation thereof for rotation about an axis substantially parallel with the axis of rotation of said driving arm, means for rotating said driving arm and said screw arm about their respective axes of rotation, said conveying screw being articulated to said screw arm at a point remote from the axis of rotation thereof, whereby at least that part of said conveying screw articulated to said screw arm will follow a path, within and relatively to said receptacle, with a motion having both a rotational component about and a radial component to and from the axis of symmetry of said receptacle.

2. A mixer according to claim 1, including a fixed annulus provided with teeth thereon, said annulus being coaxial with the axis of rotation of said driving arm, wherein said means for rotating said screw arm comprises a planetary pinion meshing with said teeth, said pinion carried by said screw arm at a position co-axial with the axis of rotation thereof.

3. A mixer as claimed in claim 1, wherein said screw is of a simple Archimedian form with a thread of constant pitch throughout its effective length.

4. A mixer as claimed in claim 1, wherein said screw has portions of the effective length thereof having "threads" of different hand.

5. A mixer as claimed in claim 1, wherein said screw is of a compound form having at least two coaxial threads to produce, with unidirectional rotation of said screw about its axis, in the material within the receptacle, a complex flow pattern.

6. A mixer according to claim 1, including means for rotating said screw about its own axis to move said material in the direction of the length of said screw, and a universal joint disposed at the lower apex end of said receptacle for restraining one end of said screw against radial movement with respect to said axis of symmetry of said receptacle, wherein said receptacle is of inverted hollow conical form.

7. A mixer as claimed in claim 6, provided with an outlet towards the lower apex end of said receptacle.

8. A mixer comprising at least one mixing receptacle; at least one conveying screw; first driving means for rotating said conveying screw about its own axis to move material to be mixed in the direction of the length of the screw; a radially disposed screw arm rotatively secured to said screw; a rotary driving arm rotatively secured to said screw arm, said screw arm and driving arm together constituting part of second driving means; intermediate driving means transmitting rotary motion to said screw arm from said driving arm to cause said screw arm to rotate about its connection to said driving arm to cause at least part of said screw to follow a path within, and relatively to, the receptacle with a motion having both a rotational component about and a radial component to and from the axis of symmetry of the receptacle.

9. A mixer comprising two mixing receptacles, at least one conveying screw in each receptacle, each said conveying screw being rotatable about its own axis to move material within its receptacle in the direction of the length of said screw, a driving arm for each screw, each said driving arm being arranged for rotation about an axis substantially coincident with the axis of symmetry of the appropriate receptacle, a screw arm mounted on each of said driving arms eccentric of the axis of rotation thereof for rotation about axes substantially parallel with the axes of rotation of said driving arms, means for rotating said driving arms and said screw arms about their respective axes of rotation, said conveying screws being articulated to their respective screw arms at points remote from the axes of rotation thereof, whereby at least that part of each said conveying screw articulated to its screw arm will follow a path substantially within and relative to its receptacle with a motion having both a rotational component about and a radial component to and from the axis of symmetry of its receptacle, and means interconnecting said receptacles which permit material mixed and discharged from one receptacle to enter said second receptacle for further mixing.

References Cited

UNITED STATES PATENTS

| | | | |
|---|---|---|---|
| 364,622 | 6/1887 | Zies | 259—129 |
| 2,668,764 | 2/1954 | Nauta | 259—40 X |
| 2,732,186 | 1/1956 | Ivarsson | 259—102 |
| 2,893,709 | 7/1959 | Nauta | 259—64 |
| 3,251,582 | 5/1966 | Murphy | 259—111 |

FOREIGN PATENTS

| | | |
|---|---|---|
| 360,806 | 11/1931 | Great Britain. |
| 927,944 | 6/1963 | Great Britain. |
| 1,054,811 | 4/1959 | Germany. |

OTHER REFERENCES

German printed application, F 16031, August 1956.

WALTER A. SCHEEL, *Primary Examiner.*

J. M. BELL, *Assistant Examiner.*